United States Patent [19]

Burkhart et al.

[11] Patent Number: 5,132,333

[45] Date of Patent: Jul. 21, 1992

[54] METHOD FOR THE PREPARATION OF FLEXIBLE POLYURETHANE FOAMS WITH REDUCED HARDNESS COMPRISING ADDING A HYDROXYCARBOXYLIC ACID SALT

[75] Inventors: Georg Burkhart; Hans-Heinrich Schlöns, both of Essen; Volker Zellmer, Bottrop, all of Fed. Rep. of Germany

[73] Assignee: Th. Goldschmidt AG, Essen, Fed. Rep. of Germany

[21] Appl. No.: 746,127

[22] Filed: Aug. 15, 1991

[30] Foreign Application Priority Data

Sep. 13, 1990 [DE] Fed. Rep. of Germany ....... 4029081

[51] Int. Cl.$^5$ .............................................. C08G 18/08
[52] U.S. Cl. ..................................... 521/117; 521/125
[58] Field of Search ........................................ 521/117

[56] References Cited

U.S. PATENT DOCUMENTS

| | | | |
|---|---|---|---|
| 2,911,379 | 11/1959 | Parker et al. | 521/103 |
| 3,087,900 | 4/1963 | Brown | 521/117 |
| 3,087,901 | 4/1963 | Brown | 521/117 |
| 5,025,039 | 6/1991 | Neuhaus et al. | 521/117 |

FOREIGN PATENT DOCUMENTS

| | | |
|---|---|---|
| 0075424 | 3/1983 | European Pat. Off. . |
| 0358282 | 3/1990 | European Pat. Off. . |
| 0380993 | 8/1990 | European Pat. Off. . |
| 2832253 | 1/1980 | Fed. Rep. of Germany . |
| 301239 | 12/1988 | Japan . |

OTHER PUBLICATIONS

"Justus Liebigs-Annalen Der Chemie", pp. 76–136, by Werner Siefken.

*Primary Examiner*—Maurice J. Welsh
*Assistant Examiner*—Rachel Johnson
*Attorney, Agent, or Firm*—Akoo-Toren

[57] ABSTRACT

A method for the preparation of flexible foams containing urethane groups and having a reduced hardness is disclosed. Polyethers, having at least two hydroxyl groups and a molecular weight of 400 to 12,000 are reacted with polyisocyanates in the presence of catalysts and water and, optionally, in the presence of emulsifiers, stabilizers, cross linking agents, blowing agents and conventional auxiliaries and additives. The method is carried out in the presence of 0.01 to 1.0 parts by weight, based on 100 parts by weight of the polyol, of the alkali salt or the alkaline earth metal salt of a hydroxycarboxylic acid. The method enables the use of chlorofluorocarbons to be omitted largely or completely as physical blowing agents.

7 Claims, No Drawings

METHOD FOR THE PREPARATION OF FLEXIBLE POLYURETHANE FOAMS WITH REDUCED HARDNESS COMPRISING ADDING A HYDROXYCARBOXYLIC ACID SALT

FIELD OF INVENTION

The invention is directed to a method for the preparation of flexible foams containing urethane groups and having a reduced hardness, by reacting polyethers with at least two hydroxyl groups and a molecular weight of 400 to 12,000 with polyisocyanate in the presence of catalysts and water and, optionally, in the presence of emulsifiers, stabilizers, cross linking agents, blowing agents and conventional auxiliaries and additives.

In particular, the invention relates to a method for the preparation of flexible polyurethane foams with a reduced hardness, for the implementation of which no or, compared to the conventional methods of the state of the art, considerably reduced amounts of physical blowing agents, such as chlorofluorocarbons, methylene chloride, pentane, acetone and 1,1,1-trichloroethane, are required.

BACKGROUND INFORMATION AND PRIOR ART

Flexible soft polyurethane foams are used on a large scale in the upholstered furniture and automobile industries. For the different applications and the different qualities needed for these purposes, it is necessary to be able to vary over a wide range the apparent density as well as, primarily, the hardness.

Inert inorganic or organic fillers have already been used in order to produce foams with a higher hardness. The hardness can also be increased by using so-called grafted polyols, which are synthesized by polymerization reactions of unsaturated monomers or by addition reactions in the polyols used for the foaming.

A lowering of the hardness is achieved by also using physical blowing agents, such as chlorofluorocarbons or methylene chloride. Lowering the hardness by these means is in contradiction with the endeavor, for environmental reasons, to restrict the use of chlorofluorocarbons as much as possible. The same is true for methylene chloride, which is physiologically not entirely safe.

To a certain extent, this applies also to the remaining physical blowing agents, the emission of which is severely restricted in many countries.

The apparent density of flexible polyurethane foams generally is between 14 and 50 kg/m$^3$. Typical values for the hardness (DIN 53577) (at 40% compression) are between 1.0 and 6.0 kPa. If the amount of blowing agents used for the foaming is reduced, foams result with a comparatively higher density and hardness. This increase in density can be counteracted by increasing the amount of water added. The hardness, however, is unaffected by the addition of water and remains at the undesirably high level.

The present invention sets out to solve the technical problem of finding a method, which, with a reduced amount of physical blowing agent, particularly of chlorofluorocarbons or methylene chloride, and optionally with a tolerable increase in the amount of water added, enables flexible polyurethane foams to be produced with a hardness which is low relative to the resulting apparent density, (also referred to as weight by unit volume).

From EP-A-0 358 282, it is known that the amount of chlorofluorocarbons to be used for a method of the initially described kind can be reduced if the foaming is carried out in the presence of 0.001 to 1 parts by weight, based on 100 parts by weight of the polyol, of one or more water-soluble, organic polyelectrolytes, which are not cross linked and have a molecular weight of 1,000 to 20,000,000. Preferably, alkali salts of polyacrylates with a molecular weight of 2,000 to 10,000 should be used as polyelectrolytes in amounts of 0.1 to 0.5 parts by weight per 100 parts by weight of polyol.

A product is also already available under the name of ORTEGOL 300, which enables physical blowing agents, such as chlorofluorocarbons, to be partially replaced during polyurethane foaming. The product is a mixture of different active ingredients and has a pH of more than 12. At times, this procedure results in corrosion problems during storage and application. Moreover, there is a tendency for the individual components to separate.

OBJECT OF THE INVENTION

It is an object of the present invention to provide a method for the preparation of flexible polyurethane foams, in which
a) the use of physical blowing agents generally, but particularly the use of chlorofluorocarbons and also of methylene chloride can be avoided or, at least, reduced considerably,
b) the resulting foams have the desirable low apparent density (weight by unit volume) at a lower hardness and
c) neither measuring-out (dosage) problems nor corrosion problems are caused by the new additive.

SUMMARY OF THE INVENTION

Pursuant to the invention, the method of the initially mentioned type is carried out in the presence of 0.01 to 1.0 parts by weight, based on 100 parts by weight of polyol, of an alkali metal salt or an alkaline earth metal salt of a hydroxycarboxylic acid.

It is also possible to use mixtures of salts of hydroxycarboxylic acids. If the hydroxycarboxylic acid has more than one carboxyl group, it is possible to use the completely, as well as the partially neutralized compounds.

Preferably, the salts of malic acid, tartaric acid, citric acid and lactic acid are used. The alkali salts and, in particular, the sodium salts of the hydroxycarboxylic acid are preferred as salts.

The salts of the hydroxycarboxylic acid are used in amounts of 0.01 to 1.0 parts by weight, based on 100 parts by weight of polyol. Preferably, 0.05 to 0.8 parts of the salts of the hydroxycarboxylic acid are used.

It is already known that the salts of hydroxycarboxylic acids can be used in significantly higher concentrations and for other purposes in the production of flexible polyurethane foams.

For example, in the Japanese publication JP 63301239, the use of salts of hydroxycarboxylic acids, for the preparation of flexible polyurethane foams which are used in food packaging, is described. The concentration used is of the order of 5 parts by weight, based on 100 parts by weight of polyol.

In EP-A-0 075 424, salts of hydroxycarboxylic acid are named as flue gas diminishers for flame-retarded, flexible, highly resilient polyurethane foams. Here also, the necessary concentration is more than 5 parts by weight.

The inventive teaching could thus not be inferred from either of these publications, nor was it made obvious by these publications.

The relationship between the density and the hardness of a flexible polyurethane foam on the one hand, and the content of water, trichlorofluoromethane (F 11) as blowing agent and the sodium salt of tartaric acid which has been added pursuant to the invention, is evident from the following Tables 1 and 2.

TABLE 1

| Formulation | Parts of Polyol | Parts of Diisocyanate | F 11 | Water | Disodium Tartrate |
|---|---|---|---|---|---|
| 1 | 100 | 56.4 | — | 4.8 | 0 |
| 2 | 100 | 47.3 | 8 | 3.9 | 0 |
| 3 | 100 | 56.4 | — | 4.8 | 0.4 |
| 4 | 100 | 38.1 | — | 3.0 | 0 |
| 5 | 100 | 31.0 | 6 | 2.3 | 0 |
| 6 | 100 | 38.1 | — | 3.0 | 0.4 |
| 7 | 100 | 27.4 | 11 | 1.9 | 0 |
| 8 | 100 | 34.7 | 4 | 2.6 | 0.4 |

TABLE 2

| Formulation | Foam Density | Hardness (40% Compression) |
|---|---|---|
| 1 | 21 kg/m$^3$ | 3.1 kPa |
| 2 | 21 kg/m$^3$ | 2.0 kPa |
| 3 | 21 kg/m$^3$ | 2.1 kPa |
| 4 | 31 kg/m$^3$ | 2.9 kPa |
| 5 | 31 kg/m$^3$ | 2.0 kPa |
| 6 | 31 kg/m$^3$ | 2.0 kPa |
| 7 | 32 kg/m$^3$ | 1.8 kPa |
| 8 | 32 kg/m$^3$ | 1.9 kPa |

The advantage of the inventive method is clearly identifiable from Tables 1 and 2. Due to the addition of disodium tartrate, it is possible to do completely or partly without the use of chlorofluorocarbons, The following are used as starting materials for the preparation of flexible polyurethane foams:

Aliphatic, cycloaliphatic, araliphatic, aromatic and heterocyclic polyisocyanates, such as those described, for example by W. Siefken in Justus Liebigs *Annalen der Chemie*, 562, pages 75 to 136, for example, those having the formula

$Q(NCO)_n$ wherein
n=2 to 4 and preferably 2, and
Q is an aliphatic hydrocarbon group with 2 to 18 and preferably 6 to 10 carbon atoms,
a cycloaliphatic hydrocarbon group with 4 to 15 and preferably 5 to 10 carbon atoms,
an aromatic hydrocarbon group with 6 to 15 and preferably 6 to 13 carbon atoms,
or an araliphatic hydrocarbon group with 8 to 15 and preferably 8 to 13 carbon atoms, for example, polyisocyanates similar to those described in the German Offenlegungsschrift 28 32 253, pages 10 to 11.

Preferred pursuant to the invention are polyisocyanates of the diphenylmethane diisocyanate type and/or toluylene diisocyanate type, for example, 2,4- and 2,6-toluylene diisocyanate, as well as any mixtures of these isomers (TDI); 4,4'- and for 2,4'-diphenylmethane diisocyanate (MDI), hexamethylene diisocyanate and/or isophorone diisocyanate, polyphenylpolymethylene polyisocyanates, such as those synthesized by the the hardness at the same apparent density of the foams obtained remaining practically unchanged.

To carry out the inventive method, it is advisable to prepare a concentrated, aqueous solution of the salts of the hydroxycarboxylic acids. The solubility of these salts in water is very good and 20 to 50% solutions by weight can be prepared. In carrying out the method, these solutions are then advantageously added separately or to the so-called activator solution, consisting of water, stabilizer and amine catalyst, or to the polyol or to a portion of the polyol. The amount of water, brought into the system by these means, is slight and can, moreover be considered to be part of the water required for the foaming.

The aqueous solutions of the salts of the hydroxycarboxylic acids are largely neutral in their reaction, so that no additional corrosion problems are created.

The processing latitude within the formulation is sufficiently large to ensure a reproducible procedure with reproducible product properties.

Aside from the hardness, the remaining properties of the flexible polyurethane foams are not adversely affected by the addition of the salts of the hydroxycarboxylic acids in the concentration range given.

In other respects, the method for the preparation of flexible polyurethane foams can be carried out in the usual manner and with the starting materials known from the state of the art. aniline formaldehyde condensation and subsequent phosgenation ("crude MDI"), furthermore, polyisocyanates, which are modified by carbodiimide groups, urethane groups, allophanate groups, isocyanate groups, urea groups and biuret groups and are derived from 2,4- and/or 2,6-toluylene diisocyanate or from 4,4' and/or 2,4-diphenylmethane diisocyanate and/or hexamethylene diisocyanate and or isophorone diisocyanate, as well as alkyl-substituted MDI types, such as those described, for example, in the German Offenlegungsschrift 29 35 318 and the German Offenlegungsschrift 30 32 128.

As polyisocyanates, which can be used pursuant to the invention, the following TDI types come into consideration preferably:
toluylene diisocyanate as an 80:20 mixture of the 2,4- and 2,6-isomers (T 80)
toluylene diisocyanate as a 65:35 mixture of the 2,4- and 2,6-isomers (T 65)
toluylene diisocyanate prepolymers
mixtures of TDI and diphenylmethane diisocyanate and/or polyphenylpoly-methylene polyisocyanates.

The suitable polyols have a molecular weight of 400 to 12,000 and a functionality preferably of 2 to 8, polyether polyols with terminal hydroxyl groups being preferred. The polyols generally are synthesized by an addition reaction between ethylene oxide and/or propylene oxide on the one hand, and low molecular weight, multihydric alcohols, such as glycerin or trimethylolpropane, on the other.

Additional polyols are known to those skilled in the art and can be taken, for example, from the EP-A-0 380 993.

Generally used as catalysts are amines, such as triethylenediamine, bis-(2-dimethylaminoethyl) ether, N,N-dimethylethanolamine, N,N,N'N",N"-pentamethyldiethylenetriamine, N-methylmorpholine, dimethylbenzylamine, tertiary alkyl phosphines, tin(II) octoate, dibutyl tin(IV) dilaurate, as well as chelates of metals, such as the chelates of acetyl acetonate of magnesium, zirconium or nickel. The catalyst is used in amounts of 0.01 to 1.0 parts by weight, based on 100 parts by weight of polyol.

Further conventional additives are flame retardants, fillers, pigments, plasticizers, antistats and cell regulators. These and other auxiliaries are known to those skilled in the art.

In the following examples, the preparation of flexible polyurethane foams by the method of the state of the art and by the inventive method is demonstrated first, using different formulations. The properties of the foams obtained are explained in greater detail. It should be understood that these examples are given by way of illustration and not by way of limitation.

The following products and product names are used in the examples.

Polyol A: a commercially available polyol with secondary terminal OH groups and an ethylene oxide content of about 11%; the OH number $\approx 48$ and the molecular weight $\approx 3,500$ g/mole.

Polyol B: a commercially available polyol with secondary, terminal OH groups exclusively on the basis of propylene oxide, with an OH number $\approx 48$ and a molecular weight $\approx 3,500$ g/mole.

Polyol C: a commercially available polyol with predominantly primary terminal OH groups, which contains a polyurea dispersion that is resistant to sedimentation, as filler (the so-called PHD polyol); the OH number $\approx 28$ Polyol D: a commercially available polyol with predominantly primary terminal OH groups, which contains a copolymer that is based on styrene and acrylonitrile and is resistant to sedimentation (so-called polymer polyol); the OH number $\approx 30$.

Polyol E: a commercially available polyol with predominantly primary terminal OH groups, which contains a dispersion that is synthesized by the in-situ reaction between an isocyanate and an alkanolamine and is resistant to sedimentation (the so-called PIPA polyol); the OH number $\approx 28$.

Polyol F: a commercially available polyol with predominantly primary, terminal OH groups and an OH number $\approx 36$.

TEGOSTAB BF 2370: commercially available foam stabilizer

TEGOSTAB B 3136: commercially available foam stabilizer

TEGOSTAB B 8681: commercially available foam stabilizer

F11: trichlorofluoromethane $CH_2Cl_2$: methylene chloride

Desmodur T 80: commercially available toluylene diisocyanate, characterized by an 80:20 isomer ratio of 2,4- to 2,6-

Desmodur T 65: commercially available toluylene diisocyanate, characterized by an 65:35 isomer ratio of 2,4- to 2,6- melamine: commercially available melamine with an average particle size of 20 μm glycerin: commercially available quality DEOA: N,N-diethanolamine ORTEGOL 204: commercially available cross linking agent of German patents 25 07 161 and 26 03 498

TEGOAMINE BDE: 70% solution of bis(2-dimethylaminoethyl) ether in dipropylene glycol TEGOAMIN 33: 33% solution of triethylamine in dipropylene glycol TEGOAMIN SMP: commercially available amine catalyst TEGOAMIN PTA: commercially available amine catalyst TEGO ANTIFLAMM: commercially available flame retardant based on chlorinated esters of phosphoric acid KOSMOS 29: tin(II) octoate KOSMOS 19: dibutyl tin(IV) dilaurate.

In formulations which contain salts of hydroxycarboxylic acids pursuant to the invention, in each case 1% by weight of an aqueous solution is added, the amount of water thus introduced being taken into consideration and considered part of the total amount of water. The following solutions are equivalent in their effect and can be exchanged for one another as desired:

TABLE 3

| Salt of the Hydrocarboxylic acid | % by Weight of the Aqueous Solution |
| --- | --- |
| sodium lactate | 20 |
| disodium tartrate | 40 |
| monosodium malate | 20 |
| disodium malate | 10 |
| disodium citrate | 25 |
| trisodium citrate | 12 |
| sodium mandelate | 65 |
| 1:1 mixture of sodium lactate and monosodium malate | 20 |
| 2:1 mixture of disodium tartrate and trisodium citrate | 30 |
| 2:1 mixture of disodium tartrate and disodium malate | 30 |

The foams are prepared according to the so-called hand mix-method. All the components, with the exception of the isocyanate and optionally the physical blowing agent, are prestirred for 60 seconds at 1,000 revolutions/minute. The isocyanate and, optionally, the blowing agent are added subsequently and stirred for a further seven seconds at 2,500 revolutions/minute. The liquid mixture is then transferred to an open container with the dimensions of 30 cm×30 cm×30 cm, so that the foam can rise freely.

The apparent density and the hardness are determined after 72 hours of storage under standard conditions of temperature and humidity, that is at 23°±1° C. and 50±2% relative humidity. The hardness is determined by the method of DIN 563 577 at 40% compression.

TABLE 4

| | Formulations (Data in % by weight) | | | | | | | | | | | | | | | | |
| --- | --- | --- | --- | --- | --- | --- | --- | --- | --- | --- | --- | --- | --- | --- | --- | --- | --- |
| | 1 | 2 | 3 | 4 | 5 | 6 | 7 | 8 | 9 | 10 | 11 | 12 | 13 | 14 | 15 | 16 | 17 |
| Polyol A | 100 | 100 | 100 | — | — | 100 | 100 | 100 | 100 | 100 | 100 | 100 | 100 | 100 | 100 | | |
| Polyol B | — | — | — | 100 | 100 | — | — | — | — | — | — | — | — | — | — | | |
| Polyol F | | | | | | | | | | | | | | | | 100 | 100 |

TABLE 4-continued

| | Formulations (Data in % by weight) | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| Water (total) | 4.8 | 3.9 | 4.8 | 4.8 | 4.8 | 3.0 | 2.3 | 3.0 | 1.9 | 2.6 | 4.5 | 5.3 | 4.0 | 3.3 | 4.0 | 3.1 | 3.1 |
| Tegostab BF 2370 | 1.0 | 1.4 | 1.6 | 1.0 | 1.6 | 0.8 | 1.0 | 1.0 | 1.0 | 1.2 | 1.8 | 2.0 | 1.0 | 1.2 | 1.4 | | |
| Tegostab B 3136 | | | | | | | | | | | | | | | | 1.1 | 1.1 |
| F 11 | — | 8 | — | — | — | — | 6 | — | 11 | 4 | — | — | — | 7 | — | | |
| $CH_2Cl_2$ | — | — | — | — | — | — | — | — | — | — | 15 | 5 | — | — | — | | |
| Tegoamin 33 | — | — | — | — | — | — | — | — | 0.6 | 0.4 | — | — | — | — | — | | |
| Tegoamin PTA | 0.15 | 0.25 | 0.10 | 0.15 | 0.10 | 0.25 | 0.35 | 0.20 | — | — | — | — | 0.20 | 0.30 | 0.20 | 0.30 | 0.25 |
| Tegoamin SMP | — | — | — | — | — | — | — | — | — | — | 0.30 | 0.20 | — | — | — | | |
| Kosmos 29 | 0.25 | 0.25 | 0.25 | 0.25 | 0.25 | 0.22 | 0.22 | 0.22 | 0.05 | 0.18 | 0.35 | 0.27 | 0.22 | 0.22 | 0.22 | 0.28 | 0.28 |
| Desmodur T 65 | | | | | | | | | | | | | | | | 38.65 | 38.65 |
| Desmodur T 80 | 56.4 | 47.3 | 56.4 | 56.4 | 56.4 | 38.1 | 31.1 | 38.1 | 27.4 | 34.7 | 53.4 | 61.5 | 48.3 | 41.2 | 48.3 | | |
| Tego Antiflamm | — | — | — | — | — | — | — | — | — | — | — | — | 8 | 8 | 8 | | |
| Glycerin | | | | | | | | | | | | | | | | 0.30 | 0.30 |
| Inventive Compound | — | — | 1.0 | — | 1.0 | — | — | 1.0 | — | 1.0 | — | 1.0 | — | — | 1.0 | — | 1.0 |
| Density (kg/m$^3$) | 21.4 | 20.8 | 21.2 | 21.2 | 21.0 | 31.8 | 31.4 | 31.7 | 31.0 | 31.0 | 15.7 | 16.7 | 25.9 | 25.8 | 26.0 | 32.3 | 32.4 |
| Hardness (kPa) | 3.1 | 2.0 | 2.0 | 3.2 | 2.1 | 3.1 | 1.9 | 2.0 | 1.6 | 1.7 | 1.6 | 1.8 | 2.9 | 1.9 | 2.0 | 4.2 | 3.4 |

The mode of action of the inventive compounds is explained in Examples 1 to 3.

When 4.8 parts by weight of water are used, a foam is obtained with an apparent density of 21.4 kg/m³ and a hardness of 3.1 kPa (Example 1). The same apparent density is attained, when 3.9 parts by weight of water are used in combination with 8 parts by weight of F 11; however, this foam is approximately 30% softer, having a hardness of 2.0 kPa (Example 2). In order to obtain the apparent density as well as the low hardness without also using physical blowing agents, the higher water content of Example 1 and the use of the inventive compounds are required (Example 3).

In other words, 8 parts by weight of F 11 can be replaced by the combination of a higher water content and the softening additive.

Examples 5 and 6 show that this is independent of the type of polyol.

This is true also for examples 16 and 17. In these examples, it is possible to show, in addition, that the desired decrease in the hardness also occurs with a different isocyanate.

It can be inferred from the formulations 9 and 10 or 11 and 12 that combinations of the inventive compounds with physical blowing agents are also possible. By these means, the use of the latter is restricted to a minimum.

Examples 13 to 15 confirm that the additional use of a flame retardant has no effect on the decrease in hardness.

TABLE 5

| | Formulations (Data in % by weight) | | | | | | | | |
|---|---|---|---|---|---|---|---|---|---|
| | 18 | 19 | 20 | 21 | 22 | 23 | 24 | 25 | 26 |
| Polyol C | 100 | 100 | — | — | — | — | — | — | — |
| Polyol D | — | — | 100 | 100 | — | — | — | — | — |
| Polyol E | — | — | — | — | 100 | 100 | — | — | — |
| Polyol F | — | — | — | — | — | — | 100 | 100 | 100 |
| Water (total) | 3.5 | 3.5 | 3.0 | 3.0 | 2.5 | 2.5 | 3.5 | 3.5 | 2.7 |
| F 11 | — | — | — | — | — | — | — | — | 8 |
| DEOA | 1.1 | 1.1 | 0.7 | 0.7 | 0.13 | 0.13 | 0.5 | 0.5 | 0.5 |
| Ortegol 204 | — | — | — | — | — | — | 3.0 | 3.0 | 3.0 |
| Kosmos 29 | 0.15 | 0.15 | — | — | — | — | 0.15 | 0.15 | 0.15 |
| Kosmos 19 | — | — | 0.1 | 0.1 | 0.05 | 0.05 | — | — | — |
| Tegoamin BDE | 0.04 | 0.04 | 0.04 | 0.04 | 0.14 | 0.14 | 0.08 | 0.1 | 0.12 |
| Tegoamin 33 | 0.3 | 0.3 | 0.15 | 0.15 | — | — | 0.3 | 0.3 | 0.4 |
| Tegostab B 8681 | 0.8 | 0.8 | 0.8 | 0.8 | 0.5 | 0.5 | 0.8 | 0.8 | 0.8 |
| Tego Antiflamm | 5 | 5 | 5 | 5 | 5 | 5 | 5 | 5 | 5 |
| Desmodur T 80 | 44.6 | 44.6 | 35.6 | 35.6 | 34.6 | 34.6 | 44.7 | 44.7 | 37.0 |
| Melamine | 25 | 25 | 25 | 25 | 25 | 25 | 25 | 25 | 25 |
| Inventive Compound | — | 1.0 | — | 1.0 | — | 1.0 | — | 1.0 | — |
| Density (kg/m$^3$) | 31.6 | 32.3 | 37.0 | 37.4 | 42.0 | 41.4 | 32.0 | 31.8 | 32.2 |
| Hardness (kPa) | 3.2 | 2.1 | 4.8 | 3.5 | 4.6 | 3.2 | 2.9 | 2.0 | 2.0 |

Experiments 18 to 26 show that the addition of the inventive compounds results in a significant decrease in hardness and, moreover, one which is again independent of the respective water content of the formulation, also in those formulations, which are based on highly reactive polyols and cross linking agents.

Even when hardness-increasing additives, such as melamine, are added, soft flexible foams can be produced by using the inventive additives.

We claim:

1. A method for producing flexible urethane group comprising foam having a low hardness value which comprises reacting a mixture of
   (a) a polyether of a mole weight of about between 400 to 12,000 and containing at least 2 hydroxyl groups with
   (b) polyisocyanate in the presence of about between 0.01 to 1.0 parts by weight, calculated on 100 parts by weight of (a), of an alkali metal salt or an alkaline earth metal salt of a hydroxycarboxylic acid.

2. The method of claim 1, wherein the mixture is devoid of chlorofluorocarbons and other physical blowing agents.

3. In a method for the preparation of flexible foam containing urethane groups and having a reduced hardness, wherein polyether with at least two hydroxyl groups and a molecular weight of about between 400 to 12,000 is reacted with polyisocyanate in the presence of a catalyst and water and, optionally, an emulsifier, stabilizer, cross linking agent, blowing agent and conventional auxiliaries and additives, the improvement which comprises carrying out the method in the presence of about between 0.01 to 1.0 parts by weight, based on 100 parts by weight of the polyol, of the alkali salt or the alkaline earth metal salt of a hydroxycarboxylic acid.

4. The improvement of claim 3, wherein the alkali salts or alkaline earth metal salts of malic acid, tartaric acid, citric acid or lactic acid are used.

5. The improvement of claims 3 or 4, wherein the sodium salts of the hydroxycarboxylic acid are used.

6. The improvement of claims 2 or 5, wherein the salts of the hydroxycarboxylic acid or their concentrated aqueous solution are added separately to the foaming formulation or to an activator solution of water, stabilizer and amine catalyst, or to the polyol or to a portion of polyol.

7. The improvement of claim 6, wherein said aqueous solution has a concentration of about between 20 to 50% by weight.

* * * * *